United States Patent
Blumenfeld et al.

(10) Patent No.: US 7,212,876 B2
(45) Date of Patent: May 1, 2007

(54) MAINTENANCE OPPORTUNITY PLANNING SYSTEM AND METHOD

(75) Inventors: Dennis E. Blumenfeld, Ann Arbor, MI (US); Qing Chang, Troy, MI (US); Samuel P. Marin, Rochester, MI (US); Roland J. Menassa, Macomb, MI (US); James W. Wells, Rochester Hills, MI (US); Guoxian Xiao, Troy, MI (US)

(73) Assignee: General Motors Corporation, Detroit, MI (US)

( * ) Notice: Subject to any disclaimer, the term of this patent is extended or adjusted under 35 U.S.C. 154(b) by 138 days.

(21) Appl. No.: 10/937,087

(22) Filed: Sep. 9, 2004

(65) Prior Publication Data

US 2006/0052898 A1 Mar. 9, 2006

(51) Int. Cl.
*G06F 19/00* (2006.01)
(52) U.S. Cl. ........................... 700/99; 700/108
(58) Field of Classification Search ............ 700/95–97, 700/99–102, 117–121, 108–111
See application file for complete search history.

(56) References Cited

U.S. PATENT DOCUMENTS

| | | | | |
|---|---|---|---|---|
| 5,216,612 A * | 6/1993 | Cornett et al. ................. | 700/96 |
| 5,548,535 A * | 8/1996 | Zvonar ......................... | 702/81 |
| 5,581,486 A * | 12/1996 | Terada et al. ................ | 702/177 |
| 5,993,041 A * | 11/1999 | Toba ............................ | 700/99 |
| 6,311,093 B1 * | 10/2001 | Brown .......................... | 700/95 |
| 6,580,967 B2 * | 6/2003 | Jevtic et al. ................. | 700/228 |
| 6,615,091 B1 * | 9/2003 | Birchenough et al. ......... | 700/96 |
| 6,662,064 B2 * | 12/2003 | Vollmar et al. .............. | 700/100 |
| 6,845,294 B2 * | 1/2005 | Jevtic et al. ................. | 700/228 |
| 6,879,866 B2 * | 4/2005 | Tel et al. ..................... | 700/100 |
| 6,983,188 B2 * | 1/2006 | Loughran et al. .............. | 700/99 |
| 6,983,229 B2 * | 1/2006 | Brown .......................... | 706/6 |
| 7,043,414 B2 * | 5/2006 | Brown .......................... | 703/12 |
| 2005/0033625 A1 * | 2/2005 | Kline ............................ | 705/9 |
| 2005/0203654 A1 * | 9/2005 | Shih et al. ................... | 700/100 |

FOREIGN PATENT DOCUMENTS

JP 2000-198050 A * 7/2000

* cited by examiner

*Primary Examiner*—M. N. Von Buhr
(74) *Attorney, Agent, or Firm*—Kathryn A. Marra

(57) ABSTRACT

A system, method, and apparatus are provided for maintenance opportunity planning in a production line having a plurality of machines and buffers between machines on the production line, with the buffers processing production units between at least two of the machines. The system, method, and apparatus advantageously indicates maximum allowed downtime for a machine, through monitoring the status of the buffers to determine whether the flow of units through the buffers is favorable, monitoring the status of the plurality of machines, and determining which of the plurality of machines may be shut down for a particular period of time while substantially maintaining the favorable flow of units through the buffers. In this way, the inventive system and method saves time and resources by reducing production line downtime and unscheduled overtime.

20 Claims, 4 Drawing Sheets

MAINTENANCE OPPORTUNITY PLANNING SYSTEM AND METHOD

TECHNICAL FIELD

The present invention relates generally to a system, method and apparatus in a production line for assembly or manufacture of products. More particularly, the invention relates to a system, method, and apparatus for monitoring the status of the buffers between machines and predicting opportunities to shut down machines for maintenance while maintaining a favorable flow of units through the buffers.

BACKGROUND OF THE INVENTION

In assembly and manufacturing lines, oftentimes there are many machines working simultaneously and production units moving down the line between the machines. Different machines perform different tasks and at different stations, production units may spend more or less time. In a preferred situation, all machines at all stations are operational and production units are moving smoothly in the buffers between stations.

In actual production, not all machines are necessarily operational and production units are not typically moving smoothly in the buffers betweens stations. There may be different reasons that not all machines are operational. For example, a machine may be idle because it is in a starved condition, that is, because there are no production units available at that particular station due to a lack of production units in the buffer feeding into that machine. A machine also may be idle because a personnel shift change is taking place, from, for example, the morning shift to the evening shift. A machine also may be idle if the operator is on a break.

A machine may be idle because the machine may be subject to a maintenance window. That is, it may be idle when maintenance is performed or waiting to be performed on a machine. The maintenance may be done according to a schedule, or there may be an immediate need due to machine malfunction. In this situation, the station operator may be made idle and may take an unscheduled break. The buffer feeding into the station may become full, causing a blocked condition in the machine immediately upstream, while the buffer fed by the station may become empty, causing a starved condition in the machine immediately downstream. This may lead station operators down the line to take unscheduled breaks. In any of these situations, time is not being efficiently utilized and therefore the production process is not cost effective. The common approach to avoiding production losses due to maintenance windows is to schedule maintenance during unscheduled overtime.

In a large production environment such as those used to manufacture automobiles, the production line may include 25 miles of conveyor. The plant itself may be three million square feet. Any increase in production timing precision is desirable for better resource allocation. Accordingly, processes that keep the line moving are advantageous.

For monitoring lines, a monitoring display may be provided in a central location that shows zones of the production that may comprise a plurality of production stations. The display shows the status of the production zones at a particular current time. The number of production units in a buffer at that current time may be shown. From that number, a maintenance operator can determine if a maintenance window on a station down the line is open.

In the current system if there are few or no units in the buffer, the operator views the monitoring display and then can roughly estimate the amount of time maintenance personnel may have to service the machine or machines down the line from the buffer. In the short term, if too much time is allocated or taken for maintenance personnel to service a machine, the buffer before the station may become blocked. Once the serviced machine is back online, the line may take more time than desirable to return to smooth operation.

In another situation relating to the longer term, it is not uncommon for service or trade personnel such as electricians to inadvertently modify parameters which may slow down cycle times. Over a period of time the zone may slow down, even if only by a second or two. However, the cumulative effect over the long term, once noticed, may have a substantial impact on overall production.

As mentioned above, the management is charged with the responsibility of watching display monitors showing rectangular indicators of different colors representing various production zones and their current statuses. According to those display monitors, the maintenance operator generally makes ad hoc decisions as to where and when to allocate maintenance personnel. Routine maintenance occurs when the opportunity arises according to the display monitors, instead of by adherence to a firm schedule of maintenance. The machines and their longevity would benefit from timely scheduled maintenance.

It would be preferable to predict opportunities that maintenance personnel may have to perform their particular maintenance duties. It would further be preferable to relieve the maintenance operator of the tedious task of monitoring the display monitors for short-lived opportunities for machinery maintenance. It would also be preferable to substantially ensure that scheduled maintenance activities occur in a timely manner. Finally, it would be advantageous to utilize maintenance personnel more fully by scheduling their work according to predicted maintenance opportunities and avoiding unscheduled overtime.

SUMMARY OF THE INVENTION

According to one aspect of the invention, a system, method and apparatus are provided for predicting opportunities for maintenance of machinery in a production environment. The inventive system, method and apparatus enables maintenance operators to, in advance of maintenance windows, predict the opportunities for maintenance.

In another aspect of the invention, the system, method and apparatus help predict the potential impact on a production zone or production line of shutting a machine down for different periods of time, by considering the opportunity calculated.

In a further aspect of this invention, a display monitor of this invention provides a graphic display including color indicators of various aspects of this invention. Particularly, color indicators may show that a number of machines may have the most pressing service requirements. Also a color indicator may show which machines are scheduled for routine maintenance. Moreover, a color may show whether a particular machine is central to production and therefore should not be taken offline during production. Furthermore, a color may show that a machine is not operating well or is sensitive to maladjustment and therefore would best be left operational until a shift change or another shut down opportunity arises.

In yet another aspect of this invention, opportunity calculations use data collected while the buffers of a zone or line are monitored as well as using historical data. Depending upon the desired speed at which an opportunity is predicted, this invention includes certain opportunity algorithms, to be described below.

DESCRIPTION OF THE PREFERRED EMBODIMENT

Figure 1:
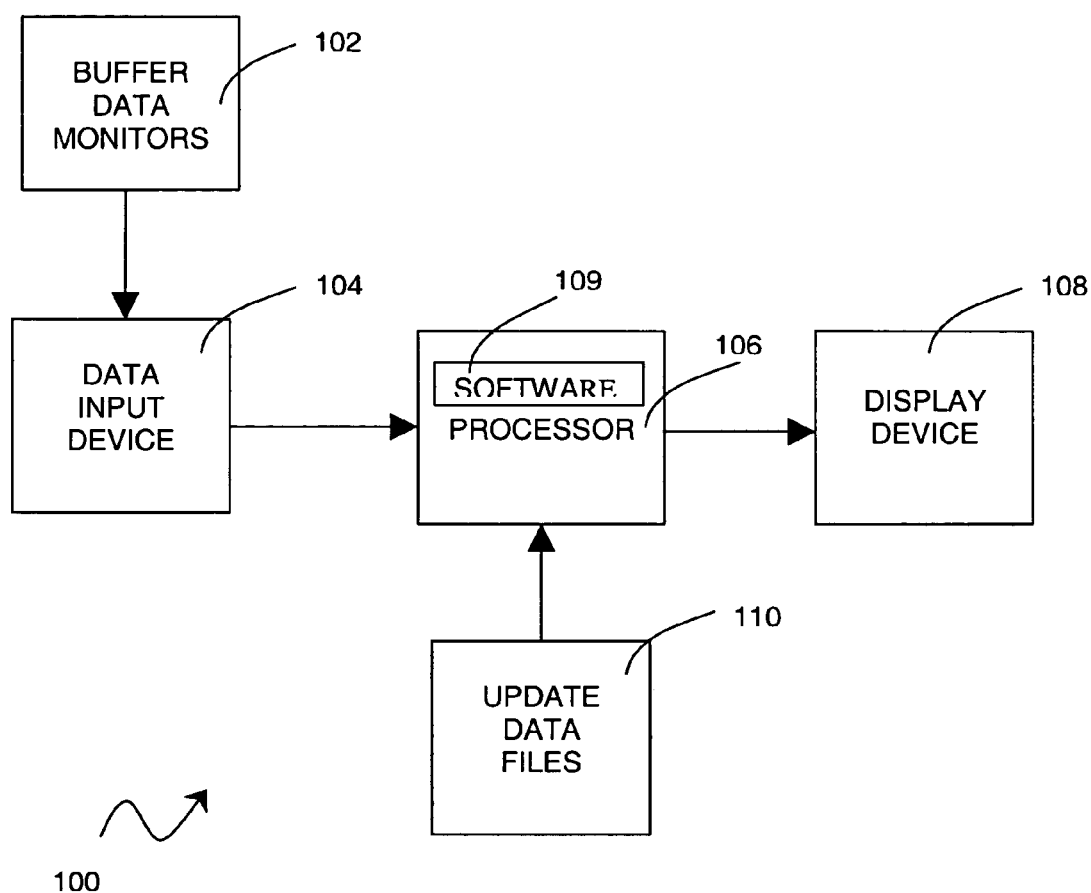
FIG. 1 shows the exemplary system and apparatus of this invention.

In accordance with exemplary embodiments, a system and apparatus for a visual impact map for maintenance and production opportunities 100, shown generally in FIG. 1, is a system that includes buffer data monitors 102, input devices 104, processors 106, one or more display devices 108 and a module for updating the data files 110.

The buffer data monitors may be broadly, without limitation, of any type that counts production units in a buffer between stations on line. Alternatively, the machine at the station may have a counter. Human resources may provide counting. In any event, the number of units in the buffer is detected and electronic data is sent to the data input device 104 via wire, or alternatively RF, IR or other wireless connections, or by a combination of wired and wireless connections. One or more processors 106 compute the opportunities for maintenance in accordance with this invention. The devices of the system and apparatus shown in FIG. 1 process all types of data in any suitable electronic form, such as digital files, image files, native files, and any combination thereof. It is to be understood that input instructions, processing instructions and output instructions may be combined together and stored on a storage medium for software 109, such as a CD or downloaded via the Internet, local network or wireless network for use by computers operating in accordance with this invention. Exemplary algorithms are described below.

One or more display devices 108 indicate information to a maintenance operator relating to the amount of time available for maintenance to be performed on particular machines in the line. More detail relating to the imparted information is described below. Data may be updated by update module 110 via keyboard, wireless link or other data transfer device, such as a PDA, which may accept input relating to information processed by the system and apparatus of this invention.

Figure 2:
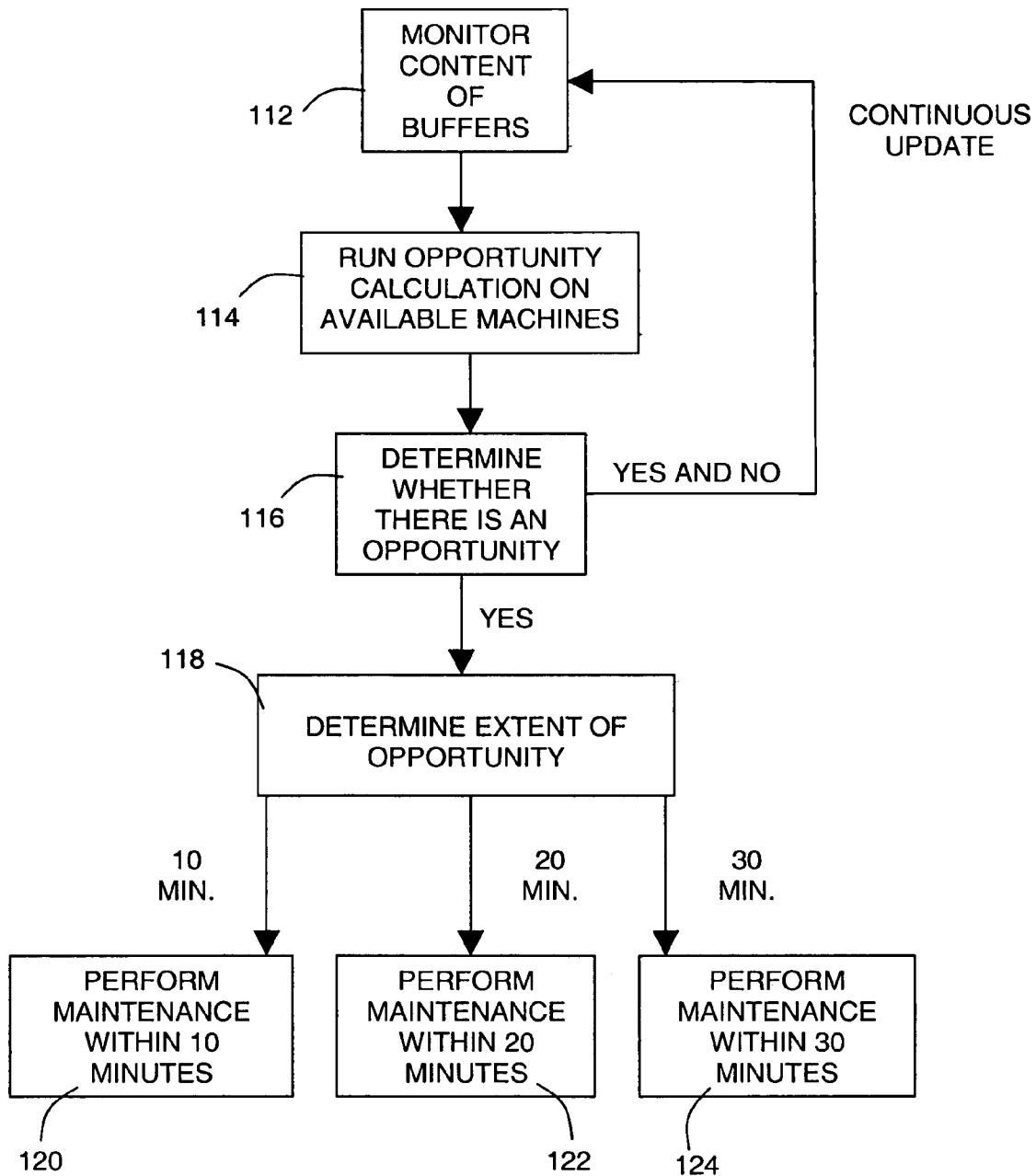
FIG. 2 shows an exemplary flowchart of the present invention.

FIG. 2 generally shows a flowchart of the inventive method. As described above, the content of the buffers is monitored 112. The processor(s) runs the opportunity calculation 114 to determine whether there is an opportunity for maintenance 116. Shown in FIG. 2 are two possible routines. Since the maintenance operator would prefer continuous processing from data sent to the processors, the system operates to substantially continuously update the information provided to the maintenance operator. When an opportunity for maintenance is predicted based upon the calculations 114, the extent of the opportunity or opportunities at identified machines is provided at 118. Different times may be provided such as shown in boxes 120, 122 and 124.

Certain downtime events can also provide the opportunity to do other preventative maintenance (PM) in downstream or blocked upstream processes and avoid scheduling these tasks on premium time or, in some cases, not performing needed PM tasks altogether. The opportunities may also be predicted based upon the calculations 114, and provided on a display. One embodiment uses real time zone and bank status data and a discrete time model to continuously update recommendations for "maximum allowed downtime" to give managers and trades the key information needed to make an intelligent decision on how to proceed with maintenance activities and avoid the costs associated with executing delayed tasks.

It will be generally appreciated that the display of information provided by the system, method and apparatus of this invention may take many different forms on a display screen and may be presented on one or more display devices to one or more interested parties and/or transferred to data storage units for further processing. The method of predicting an opportunity for the maintenance of machines in a production or assembly line, and the time allowable, enables maintenance personnel to shut down and service a machine while substantially maintaining a favorable flow of units through the buffers. The method may be performed in an automated manner or one involving human operators.

Figure 3:
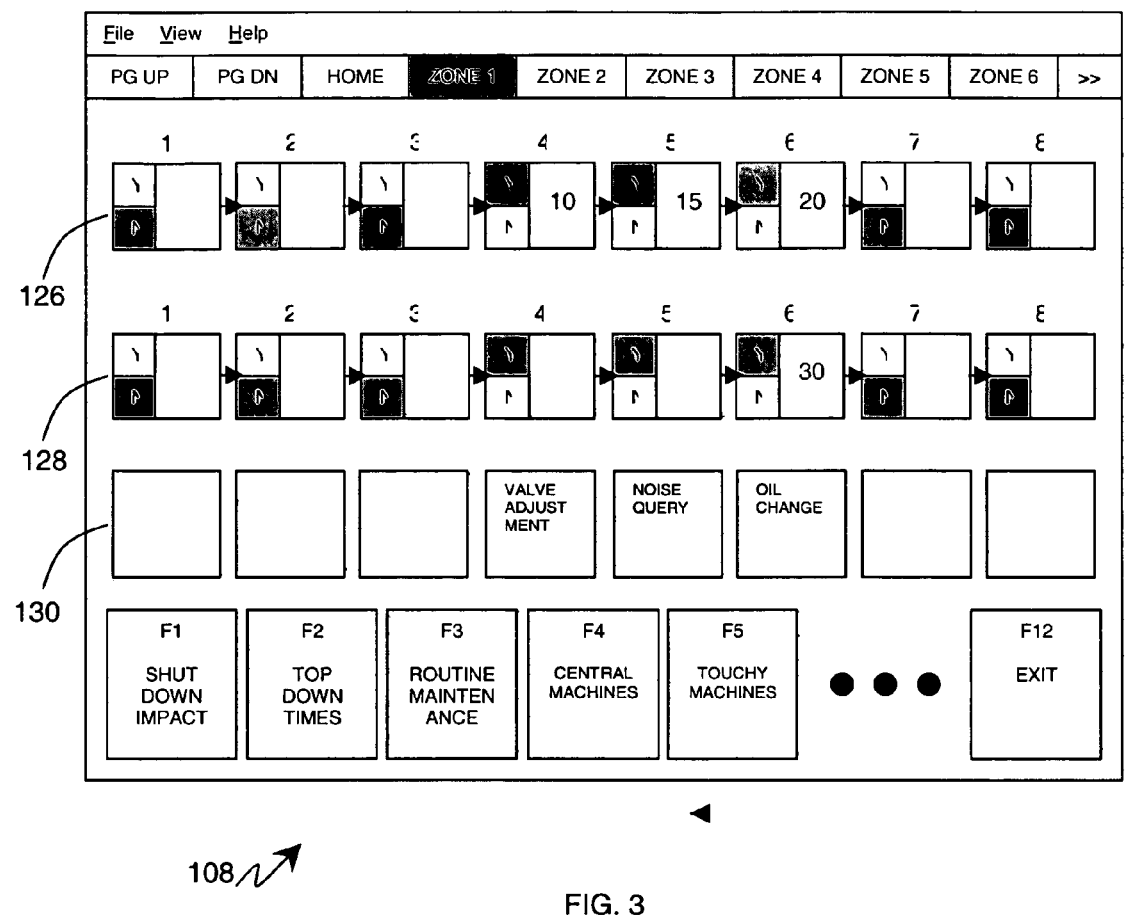
FIG. 3 shows an exemplary computer display of an embodiment of a criticality map of this invention.

Referring to FIG. 3, and in accordance with certain aspects of this invention, a display screen 108 is shown which resembles that of a common computer screen having drop down menus for File, View and Help. It will be appreciated that all other common drop down menus may be used in accordance with the display screen of this invention.

Shown in FIG. 3 is Zone 1 highlighted. Additional zones 2–6 are also shown. The screen configuration may include any number of zones. The first row of boxes 126 on the screen indicating stations 1–8 are a first choice of maintenance opportunities available. The second row of boxes 128 on the screen are a second choice of maintenance opportunities available in Zone 1. In both rows, arrows between the machines indicate production unit flow between machines. It will be appreciated that the screen display might also explicitly show buffers between the machines (see FIG. 5). Moreover, one machine may feed a plurality of buffers in parallel, or may draw from a plurality of buffers in parallel. The third row of boxes 130 indicate the preferred service for the machines in Zone 1. Referring to machines 4, 5, 6 in row 126, the Y is highlighted, indicating opportunities for maintenance. Boxes for machines 4, 5 and 6 indicate there are 10, 15 and 20 minutes available for service for the machines respectively. Machine 6 in row 128 shows 30 minutes would be available where machines 4 and 5 are not serviced. Row 130 indicates what type of service is due and may dictate which alternative is chosen for servicing the machines. For example, maybe an oil change takes a total of 30 minutes and therefore cannot be performed in 20 minutes as shown in row 126. Therefore, the option of row 128 would be preferably chosen.

FIG. 3, as described above, shows one of the many possible display screen configurations for indicating information generated by the system, method and apparatus of this invention. Also shown is a row of function buttons which may change the screen to provide further information. For example, button F1 may provide a prediction of the contents of the buffers in the event that the option of 126 or 128 is chosen. If other alternatives to options 126 and 128 are provided, then F1 may make similar predictions.

Referring to button F2, a list of the most pressing repair and thus down times may be generated. Information provided by button F2 or a different button may also include a prioritization of the stations needing maintenance, i.e. first priority which may be critical, second priority which may be important and so on. The boxes of rows 126, 128 and 130 further may be color coded to indicate priority. Combining F1 and F2 may provide options as well. Button F3 may provide a list of which machines may benefit from routine maintenance. If the maintenance personnel are available, the maintenance operator may wish to go through all the zones 1 through 6 or more, to find predicted opportunities in accordance with this invention. On the other hand, an input mode may be provided so that the number of available maintenance personnel is considered, and the screen will cycle through highlighting opportunities.

Buttons F4 and F5 may cause the screen to highlight central machines, that is, ones that preferably are not taken offline and touchy machines, ones where it has been advised, for example, not to shut down until a shift change. Other buttons not shown but included within the scope of this invention include, for example, a representation of jobs, inventories, changes in inventories and production counts in hours and shifts totals. Comparisons may be made with target production data. Also included may be a representation of machine uptimes in, for example, percentages. While maintenance is mostly discussed herein, predicting down time for tool changes is also within the scope of this invention. Data may also be included to enhance maintenance operations such as help in maintenance diagnostics for trouble shooting. Historical data may also be accessed for further information.

It will be appreciated that other F1 through F12 buttons (or more) may be included as functions readily operable within the scope of this invention, and all of the functions may be provided on the screen at a glance instead by the additional step of pressing the function button. Furthermore, the information provided in these function buttons may be indicated on the display screens with different colors, making it easier for the maintenance operator to appreciate the information with one look at the screen. The display screen further has indicators to show both current, past, and predicted conditions, simultaneously or separately.

The method of predicting opportunities to shut down certain portions of a line without substantially impacting the flow of the line presents positive possibilities for the smooth operation of a manufacturing or assembly plant. Such graphic displays as those included in embodiments of the invention also provide a real time visual opportunity map and decision support for maintenance and production. Opportunities can provide the chances to reduce downtime, in-time maintenance without impacting production, right-time production decision.

While certain algorithms are described herein that provide the opportunity function of this invention, it will be appreciated that any suitable algorithm is within the scope of this invention. One may be chosen for seeking one type of opportunity, while another may be used for seeking another type of opportunity.

Figure 4:
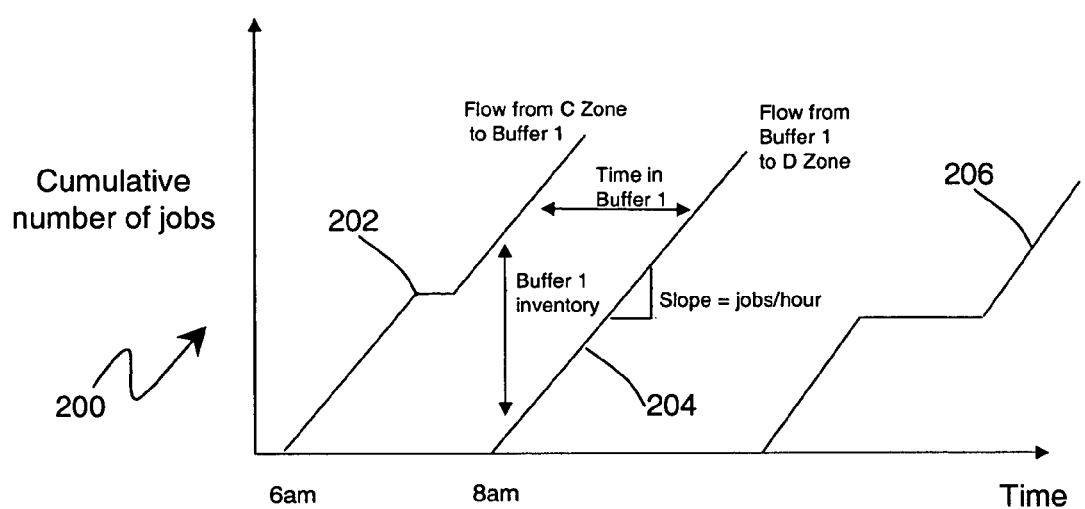
FIG. 4 is an exemplary plot showing cumulative numbers of production units in a buffer or production zone.

FIG. 4 shows a depiction 200 of the cumulative number of production units flowing through a particular production line, vs. time. The leftmost line in the plot, shown at 202, shows the cumulative number of production units that have entered Buffer 1. The next line, shown at 204, shows the cumulative number of production units that have left Buffer 1 to enter the Zone or machine immediately following Buffer 1. The rightmost line, shown at 206, shows the cumulative number of production units leaving that Zone or machine and entering the subsequent buffer. Flat portions of 202 and 206 show situations in which a buffer may be full or empty or a machine may be blocked or starved.

The algorithms described below may be best understood in terms of a plot as shown in FIG. 4. For example, the inverse of the slope of the line 204 may be directly related to the cycle time of the machine or Zone represented by the line 204. The number of production units currently in a buffer may be provided by the vertical distance between neighboring lines. The time a production unit spends in a buffer is provided by the horizontal distance between neighboring lines.

As can be seen, cumulative plots of job flows into and out of buffers would show not only the current buffer contents, but also how the buffer contents are changing over time. Flat portions of the cumulative plots indicate down times of machines feeding and drawing from buffers.

The examination of a production line for maintenance opportunities can best be described in terms of questions like: how long will it take before all buffers upstream of a downed machine are full? Or, how long before all buffers downstream of a downed machine are empty? These, and other related issues, provide the concepts underlying the algorithms and methods described next.

A number of methods can be used to find a time slot for a maintenance opportunity. Several are listed here. These include calculation procedures and discrete event simulations. In the cases presented below, it is assumed that real time data is available about the buffer contents. In addition, it is assumed that information about the fault code, and the estimated time to repair, is available as well.

Figure 5:
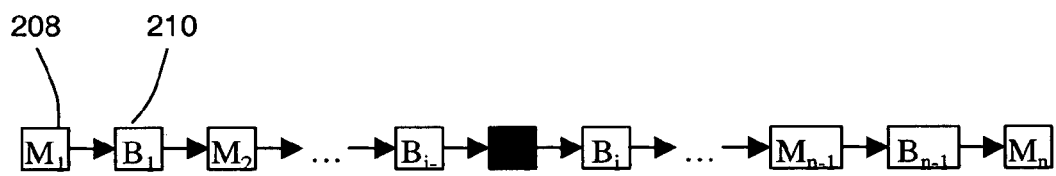
FIG. 5 is a schematic depiction of an exemplary production line including machines and buffers.

The first exemplary algorithm or method may be described as buffer movement to approximate a maintenance opportunity window. This embodiment of the invention is described in terms of a line with n machines 208 alternated with n-1 buffers 210 as shown in FIG. 5. As shown in the figure, in order to calculate the opportunity window, the machine at station i is assumed to be down. The calculation proceeds in the following way. First, the algorithm provides an estimate the time until the production line upstream of machine i is completely stopped. This estimate is provided by the following expression.

$$T_{up} = \sum_{k=1}^{i-1} Cycle_k(Capacity_k - Count_k)$$

Next, the algorithm provides an estimate the time until the buffers downstream of machine i are empty minus the time during which the first job moves out of the production line after this target machine resumes running using the following expression $$T_{down} = Cycle_n \sum_{k=i}^{n-1} Count_k - \sum_{k=i}^{n-1} Cycle_k$$

The overall estimated duration of the maintenance opportunity window for machine i is $Min(T_{up}, T_{down})$.

In the equations above for $T_{up}$ and $T_{down}$, $Cycle_k$ is the cycle time of a machine, Capacity is the storage capacity of a buffer, and Count is the current content of a buffer.

In FIG. 5, in order to calculate the opportunity window when machine $M_i$ is assumed down, the upstream and downstream processes may still continue for a short time, which is the effect permitted by the buffer. This time period together with the repair time of the machine (the mean time to repair as used for this calculation, but for any of the examples, the actual anticipated repair time based on the historical repairs for the specific repair issue provides an even better decision making support tool) determines the impact on production of taking machine $M_i$ down for repair.

The second exemplary algorithm of method may be described as a maximum time savings calculation. This embodiment is similar to the one above. Since the purpose is to find a scheduling priority for taking each machine down for repair, we propose another method for quick estimation. The following shows the pseudo code for the method: For each machine $M_j$, calculate the upstream available content, $$Up = \sum_{i}^{j} Cnt_i.$$

Next, calculate the downstream remaining capacity, $$Down = \sum_{i=j}^{n} (Capacity_i - Cnt_i).$$

Let $U_j = \min(Up, Down)$. Then, for the $j^{th}$ machine, define $Sv_j = U_j \times Cyc_j$. Next, for each repair candidate machine $M_k$, find $Index_k = \max(Sv_j)$, and finally calculate the repair priority using $priority_k = MTTR_k / Index_k$. Here, Cnt is the current content of a buffer, and $MTTR_k$ is mean time to repair of machine $M_k$.

In a third exemplary algorithm of this invention, the time from bringing the repair candidate machine down until all stations in the line stop processing parts is estimated. At this point, the stations upstream of the inoperable station will be full, and those downstream will be stripped of all parts. In applying the method, first, the time $T_1$ of the first station blocked is calculated. Next, the time $T_2$ needed to empty the last station is calculated. At this point, assume the inoperable station resumes operation, and then the time Ts of the first part reaches the end of the line is calculated. The maintenance opportunity window will be determined as $$\text{Min}(T_1, T_2 - T_s)$$

This method is similar to the first one but use simulation instead of closed form solution. But the simulation can be applied to much more complicated production line including such features as a feedback loop, a parallel line, etc.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of terms first, second, etc. do not denote any order or importance, but rather the terms first, second, etc. are used to distinguish one element from another.

The invention claimed is:

1. In a production line utilizing units in a production, the production line having a plurality of machines and buffers therebetween, wherein the buffers process units between at least two of the plurality of machines, a method for indicating maximum allowed downtime for a first machine, the method comprising:
    monitoring the status of the buffers to determine whether units are moving smoothly through the buffers;
    monitoring the status of the plurality of machines; and
    determining, based on the status of the buffers and the status of the plurality of machines, which of the plurality of machines to shut down for a particular period of time being a maximum allowed downtime so that a smooth moving of units through the buffers is substantially maintained.

2. The method of claim 1 wherein a display screen provides buffer status indicators and machine status indicators.

3. The method of claim 1 wherein an opportunity calculation algorithm determines which machine to shut down.

4. The method of claim 3 wherein the opportunity calculation algorithm provides a particular period of time for which to shut down the machine.

5. The method of claim 2 wherein a plurality of machines have present service requirements and the display screen provides indicators showing the machines that have present service requirements.

6. The method of claim 2 wherein a plurality of machines have routine service requirements and the display screen provides indicators showing the machines that have routine service requirements.

7. The method of claim 3 wherein the opportunity calculation algorithm further provides production line flow information relating to an impact of shutting down the machine for a period of time.

8. The method of claim 1 wherein monitoring the status of the buffers, monitoring status of the plurality of machines and determining which of the plurality of machines to shut down while maintaining the smooth moving of units through the buffers are performed in a continuous manner.

9. An apparatus for use in a production line having a plurality of machines and buffers therebetween, wherein the buffers process units between at least two of the plurality of machines, the apparatus for indicating maximum allowed downtime for a first machine, the apparatus comprising:
    a buffer module that monitors the status of the buffers to determine whether units are moving smoothly through the buffers;
    a machine module that monitors the maintenance status of the plurality of machines;
    a processing module that processes instructions to determine, based on the status of the buffers and the maintenance status of the plurality of machines, which of the plurality of machines to shut down for a particular period of time being a maximum allowed downtime so that a smooth moving of units through the buffers is substantially maintained.

10. The apparatus of claim 9 wherein a display screen module provides buffer status indicators and machine status indicators, representing current and past conditions.

11. The apparatus of claim 9 wherein the instructions processed by the processing module are of an opportunity calculation algorithm that determines which machine to shut down.

12. The apparatus of claim 11 wherein the opportunity calculation algorithm provides a maximum period of time for which to shut down the machine.

13. The apparatus of claim 12 wherein the opportunity calculation algorithm further provides production line flow information relating to an impact of shutting down the machine for a period of time.

14. A computer readable media for storing instructions and data thereon for use in a production line having a plurality of machines and buffers therebetween, wherein the buffers process units between at least two of the plurality of machines, the instructions and data operable on a computer for indicating a maximum allowed downtime for a first machine, comprising:

instructions stored on the media for receiving buffer data input;

instructions stored on the media for processing machine maintenance data;

instructions stored on the media for processing the buffer data and the machine maintenance data to determine, based on the buffer data input and the machine maintenance data, which of the plurality of machines to shut down for a particular period of time being a maximum allowed downtime so that a smooth moving of units through the buffers is substantially maintained; and instructions stored on the media for indicating on a display screen which of the plurality of machines to shut down accordingly.

15. The media of claim 14 wherein the instructions stored on the media for processing the buffer data and the machine maintenance data is an opportunity calculation algorithm.

16. The media of claim 15 wherein the opportunity calculation algorithm provides a maximum period of time for which to shut down the machine.

17. The media of claim 15 wherein the opportunity calculation algorithm provides production line flow information relating to the smooth moving of units through the buffers when shutting down the machine for a period of time.

18. The media of claim 15 wherein the processing instructions cause the display screen to show buffer status indicators and machine status indicators.

19. The media of claim 15 wherein a plurality of machines have present service requirements and the processing instructions cause the display screen to show indicators of the machines that have present service requirements.

20. The media of claim 15 wherein a plurality of machines have routine service requirements and the processing instructions cause the display screen to show indicators of the machines that have routine service requirements.

* * * * *